United States Patent
Bachon et al.

(10) Patent No.: US 6,964,986 B2
(45) Date of Patent: Nov. 15, 2005

(54) AQUEOUS ADHESIVE SYSTEM, METHOD FOR THE PRODUCTION AND USE THEREOF

(75) Inventors: Thomas Bachon, Duesseldorf (DE); Udo Frank Windhoevel, Monheim (DE); Thomas Tamcke, Duesseldorf (DE); Hartmut Urbath, Wuppertal (DE); Sebastian Kostyra, Monheim (DE); Katja Raker, Duesseldorf (DE)

(73) Assignee: Henkel Kommanditgesellschaft auf Aktien, Dusseldorf (DE)

( * ) Notice: Subject to any disclaimer, the term of this patent is extended or adjusted under 35 U.S.C. 154(b) by 163 days.

(21) Appl. No.: 10/344,021

(22) PCT Filed: Jul. 28, 2001

(86) PCT No.: PCT/EP01/08765
§ 371 (c)(1),
(2), (4) Date: Sep. 10, 2003

(87) PCT Pub. No.: WO02/12412
PCT Pub. Date: Feb. 14, 2002

(65) Prior Publication Data
US 2004/0068042 A1 Apr. 8, 2004

(30) Foreign Application Priority Data
Aug. 9, 2000 (DE) .......................... 100 38 934

(51) Int. Cl.$^7$ .......................... C04B 24/24; C08K 3/16; C08K 3/34

(52) U.S. Cl. .................. 524/2; 524/3; 524/4; 524/5; 524/6; 524/7; 524/8; 524/423; 524/436; 524/450

(58) Field of Search ................. 524/2–8, 423, 524/436, 450

(56) References Cited

U.S. PATENT DOCUMENTS 4,061,825 A * 12/1977 Counsell et al. ...... 428/355 CP
5,229,438 A    7/1993 Ishida et al.

FOREIGN PATENT DOCUMENTS

| DE | 33 02 439 | * | 7/1984 |
| EP | 0 782 977 | * | 7/1997 |
| EP | 1 118 628 | * | 7/2001 |

* cited by examiner

*Primary Examiner*—Peter Szekely
(74) *Attorney, Agent, or Firm*—Stephen D. Harper; Glenn E. J. Murphy

(57) ABSTRACT

An aqueous adhesive system consisting of two separate components, A and B. Component A is an aqueous dispersion of polymer containing at least one olefinically unsaturated double bond and Component B consists of a dispersion of a drying agent in an oil phase liquid. The adhesive produced by this system is useful for bonding material made of wood, cork, metal, plastic, stone and concrete.

14 Claims, No Drawings

AQUEOUS ADHESIVE SYSTEM, METHOD FOR THE PRODUCTION AND USE THEREOF

CROSS REFERENCE TO RELATED APPLICATIONS

This application is a national stage application under 35 USC 371 of international application PCT/EP01/08765 filed on Jul. 28, 2001, the international application not being published in English. This application also claims priority under 35 USC 119 to DE 100 38 934.1 file on Aug. 9, 2000.

BACKGROUND OF THE INVENTION

This invention relates to an adhesive system of at least two separate components A and B, the adhesive system comprising a) as component A an aqueous dispersion of a polymer obtainable by polyaddition or by polymerization of a monomer containing at least one olefinically unsaturated double bond or a mixture of two or more such monomers or an aqueous dispersion of a mixture of two or more such polymers and
b) as component B a dispersion of a drying agent in an oil phase liquid at 23° C., the oil phase containing at least 0.1% by weight of a compound liquid at 23° C. which is soluble in the oil phase and which contains at least one covalent single, double or triple bond between a carbon atom and a hetero atom or a mixture of two or more such compounds, to a process for the production of an adhesive of components A and B and to the use of component B for the production of binders or adhesives, coating compositions and sealants.

Water-based adhesive dispersions are used in many branches of industry for bonding substrates to one another. The use of water-based adhesive dispersions is particularly advantageous when, on the one hand, no solvent-containing vapors are intended to enter the environment during bonding while, on the other hand, the water present in the water-based adhesive dispersion is intended to be able to evaporate without difficulty. However, the use of water-based adhesive dispersions is problematical in particular when either the bonding conditions make it difficult or even impossible for the water to evaporate or the substrate to be bonded is sensitive to water, so that the use of a water-based adhesive dispersion causes damage to the substrate. In addition, water-based adhesives are also not generally suitable for use when the bond is likely to be exposed at least temporarily to an environment of extremely high atmospheric humidity, but is not expected to lose any of its strength under such conditions, or when the bond is exposed even temporarily or permanently to direct contact with water.

Accordingly, water-free adhesives have hitherto been used in the last-mentioned cases, developing their adhesive strength either through the evaporation of a readily volatile solvent or by reaction of two inter-reactive components. Adhesives of the first type are attended by the disadvantage that solvents are emitted into the environment which is not desirable where the adhesives are used indoors in view of the possible health risk posed by the solvents and the noxious odor problem associated with solvent emission. The disadvantage of reactive adhesives of the second type is that they generally contain physiologically hazardous isocyanates, epoxides, polyamines and polyamides. Understandably, users often have reservations about handling such isocyanates, epoxides, polyamines and polyamides.

Accordingly, there was a need for water-based adhesives which could even be used under conditions where evaporation of the water is difficult or largely impossible. There was also a need for water-based adhesives which could even be used in conjunction with water-sensitive substrates. However, such adhesives would be expected to have an adequate pot life, to be able to withstand load stress very soon after the end of their pot life and, in addition, to be suitable for use even indoors, particular emphasis being placed on minimal odor emission. In addition, the adhesives would be expected to show sufficient resistance to water so that they could be used in environments with high air humidity and the strength of the bond would not be affected by at least brief contact with water. Property profiles such as these are required, for example, for adhesives used for bonding laminate or parquet to corresponding substrates in interior rooms.

EP-A 0 782 977 relates to a preparation for waterproofing or vapor-proofing a substrate surface. The document in question describes two components, one an aqueous latex of a natural or synthetic rubber and the other a dispersion of a vulcanizing agent and a hygroscopic compound in an oil phase. Hydrocarbon oils are mentioned as a suitable oil phase, mixtures of hydrocarbon oils, for example a mixture of aromatic and aliphatic compounds, being particularly preferred. It is also stated in the cited document that synthetic liquid plasticizers, such as phthalates or adipates, may be present in the oil phase for adjusting the flow properties. The disadvantage of the system described in the cited document is that both the binder in the aqueous oil phase and the vulcanizing agent can lead to serious odor emissions. In addition, the described suspension of a hygroscopic compound in the hydrocarbon oils mentioned tends to undergo phase separation so that the user has to carry out a dispersion step before using the described preparation. In addition, the described preparations can show unsatisfactory curing behavior for adhesive applications because a relatively long period elapses between the end of the pot life of the preparation and the actual readiness of a surface coating formed from the described preparation to withstand load stress. Finally, nothing is said in the cited document about the use of the compositions described therein as adhesives.

When adhesives are used for bonding floor coverings, effective insulation of the floor covering from the substrate to which it is applied is often required. This insulation relates on the one hand to the transfer of heat between floor and floor covering and on the other hand to the insulating properties of the floor covering, particularly with respect to solid-borne sound. The adhesives known from the prior art are unsatisfactory in this regard because heat insulation and solid-borne sound insulation or both cannot be achieved sufficiently, if at all, using known adhesives.

SUMMARY OF THE INVENTION

Accordingly, the problem addressed by the invention was to provide water-based adhesives which could even be used under the conditions mentioned above and which would not have any of the disadvantages of the prior art.

The problem stated above is solved by an adhesive system of at least two components A and B, the adhesive system comprising an aqueous dispersion of a polyurethane or a polymer as component A and a dispersion of a drying agent in an oil phase with high polarity as component B.

DETAILED DESCRIPTION OF THE INVENTION

Accordingly, the present invention relates to an adhesive system of at least two separate components A and B, characterized in that it comprises a) as component A an aqueous dispersion of a polymer obtainable by polyaddition or by polymerization of a monomer containing at least one olefinically unsaturated double bond or a mixture of two or more such monomers or an aqueous dispersion of a mixture of two or more such polymers (polymer dispersion) and b) as component B a dispersion of a drying agent in an oil phase liquid at 23° C., the oil phase containing at least 0.1% by weight of a compound liquid at 23° C. which is soluble in the oil phase and which contains at least one covalent single, double or triple bond between a carbon atom and a hetero atom or a mixture of two or more such compounds.

An "adhesive system" in the context of the present invention is understood to be a system of which the separate components are mixed by the user before bonding to form the composition actually working as an adhesive in the sense of the present invention. In the context of the present invention, an adhesive system according to the invention comprises at least two separate components A and B.

However, an adhesive system according to the invention may equally well comprise more than two components, for example three, four or five or more components. The components present in the adhesive system according to the invention may be present in individual containers designed for separate handling, the actual adhesive being prepared by combining and mixing the contents of the separate containers.

However, the present invention also encompasses adhesive systems where the individual components, although physically separated from one another, are accommodated in a single container. Systems such as these are, for example, cartridge systems with two or more compartments. In such systems, one or more compartments may each hold one component and one or more other compartments may each hold another component. To prepare the adhesive from the individual components of the adhesive system, the corresponding compartments are simultaneously emptied and the contents are mixed to form the adhesive, for example in a static mixer, before application to the actual substrate. The adhesive system according to the invention also encompasses systems where the components forming the adhesive are present in separate compartments in a container, the compartments being joined, for example, by destruction of the partitions between them by external pressure and their contents being subsequently mixed, for example, by tumbling of the container.

In addition, "adhesive systems" in the context of the present invention are systems where components A and B are present, for example, on the lines of a one-component system, but are separated from one another by encapsulation of one of the components, more particularly by encapsulation of component B. Known microencapsulation techniques, for example spray drying and other techniques known to the expert, may be used for this purpose.

According to the invention, component A is an aqueous dispersion of a polymer obtainable by polymerization of a monomer containing at least one olefinically unsaturated double bond or a mixture of two or more such monomers or an aqueous dispersion of a mixture of two or more such polymers. Aqueous dispersions such as these are also referred to herein as polymer dispersions. Polymer dispersions obtainable by dispersion of a polymer present, for example, in powder form or of a mixture of two or more such polymers in water are suitable for use as component A. However, a preferred embodiment of the present invention is characterized by the use of aqueous dispersions which are the outcome of suspension or emulsion polymerization. According to the invention, however, other polymers—either in the form of aqueous dispersions or powders—may be added to such polymer dispersions. Dispersions suitable as component A may be prepared by standard processes for preparing polymer dispersions, such processes being known to the expert.

The polymer dispersions suitable for use as component A in accordance with the invention may be prepared, for example, from monomers containing at least one olefinically unsaturated double bond (olefinically unsaturated monomers) which are accessible to suspension or emulsion polymerization. Polymers suitable for the preparation of the aqueous dispersions usable as component A are, for example, vinyl ester polymers of which the monomeric basic unit is a vinyl ester of a linear or branched carboxylic acid containing about 2 to about 44, for example about 3 to about 15 carbon atoms. Suitable monomers for these homopolymeric or copolymeric polyvinyl esters are vinyl formate, vinyl acetate, vinyl propionate, vinyl isobutyrate, vinyl pivalate, vinyl-2-ethylhexanoate, vinyl esters of saturated branched monocarboxylic acids containing 9 to about 15 carbon atoms in the acid component, vinyl esters of relatively long-chain, saturated or unsaturated fatty acids, such as vinyl laurate, vinyl stearate or vinyl esters of benzoic acid and substituted derivatives of benzoic acid, such as vinyl-p-tert.butyl benzoate. The vinyl esters mentioned may be present in the polyvinyl ester either individually or in the form of mixtures of two or more of the vinyl esters mentioned. In a preferred embodiment of the invention, the percentage content of these vinyl esters in the polymer present in the aqueous dispersion used as component A as a whole is at least about 50% by weight, for example at least about 75% by weight. In another preferred embodiment of the present invention, vinyl acetate is used as the olefinically unsaturated monomer.

In another preferred embodiment of the present invention, the polymer dispersion may also contain polymers which, besides one of the above-mentioned vinyl esters or a mixture of two or more thereof, may also contain other comonomers. Other ethylenically unsaturated monomers which may be copolymerized with the above-mentioned vinyl esters are, for example, acrylic acid, methacrylic acid and esters thereof with primary or secondary, saturated monohydric alcohols containing 1 to about 28 carbon atoms, such as methanol, ethanol, propanol, butanol, 2-ethylhexyl alcohol, cycloaliphatic alcohols, such as cyclohexanol, hydroxymethyl cyclohexane or hydroxyethyl cyclohexane. Also suitable are the esters of the above-mentioned ethylenically unsaturated acids with relatively long-chain fatty alcohols. Other suitable comonomers are ethylenically unsaturated dicarboxylic acids, such as maleic acid, fumaric acid, itaconic acid or citraconic acid and mono- or diesters thereof with saturated monohydric aliphatic alcohols containing 1 to about 28 carbon atoms. The percentage content of such comonomers in the polymers present in the polymer dispersion may be up to about 25% by weight, for example about 0.1 to about 15% by weight.

Other suitable comonomers are simple, ethylenically unsaturated hydrocarbons, such as ethylene or α-olefins containing about 3 to about 28 carbon atoms, for example propylene, butylene, styrene, vinyl toluene, vinyl xylene and halogenated unsaturated aliphatic hydrocarbons, such as vinyl chloride, vinyl fluoride, vinylidene chloride, vinylidene fluoride and the like. The percentage content of these comonomers in the polymers used in the polymer dispersions may be up to about 50% by weight or less, for example about 0.5 to about 25% by weight.

Polyethylenically unsaturated monomers, for example, are also suitable as comonomers. Examples of such monomers are butadiene, diallyl phthalates, diallyl maleate, triallyl cyanurate, tetraallyloxyethane, divinylbenzene, butane-1,4-diol dimethacrylate, triethylene glycol dimethacrylate, divinyl adipate, allyl acrylate, allyl methacrylate, vinyl crotonate, methylene bis-acrylamide, hexanediol diacrylate, pentaerythritol diacrylate or trimethylolpropane triacrylate or mixtures of two or more thereof. The percentage content of these comonomers in the polymers prepared by emulsion polymerization present in the polymer dispersions is up to about 10% by weight, for example about 0.01 to about 5% by weight.

Other suitable comonomers are ethylenically unsaturated compounds containing N-functional groups. Such compounds include, for example, acrylamide, methacrylamide, allyl carbamate, acrylonitrile, N-methylol acrylamide, N-methylol methacrylamide, N-methylol allyl carbamate and the N-methylol esters, alkylethers or Mannich bases of N-methylol acrylamide or N-methylol methacrylamide or N-methylol allyl carbamate, acrylamidoglycolic acid, acrylamidomethoxyacetic acid methyl ester, N-(2,2-dimethoxy-1-hydroxyethyl)acrylamide, N-dimethylaminopropyl acrylamide, N-dimethylaminopropyl methacrylamide, N-methyl acrylamide, N-methyl methacrylamide, N-butyl acrylamide, N-butyl methacrylamide, N-cyclohexyl acrylamide, N-cyclohexyl methacrylamide, N-dodecyl acrylamide, N-dodecyl methacrylamide, ethyl imidazolidone methacrylate, N-vinyl formamide, N-vinyl pyrrolidone and the like.

Other polymer dispersions suitable for use as component A in accordance with the invention contain polymers or copolymers of styrene or one of its derivatives, for example α-methylstyrene. Suitable polymers have a styrene content of more than 30% by weight, for example more than 50% by weight or more than 80% by weight of the total monomeric units present in the polymer. Suitable comonomers are, for example, acrylates and methacrylates containing 1 to about 12 carbon atoms in the alcohol component, for example 2 to about 8 carbon atoms. Other suitable comonomers which may be present in a corresponding styrene copolymer either individually or in the form of a mixture of two or more thereof are, for example, vinyl esters, maleic acid esters, ethylene, acrylamide, acrylic acid, butadiene or acrylonitrile.

Other organic polymers suitable in accordance with the invention for the production of the polymer dispersions according to the invention belong to the group of styrene/butadiene rubbers (SBRs). Such rubbers are produced by copolymerization of styrene and butadiene and generally contain the two monomers in a ratio by weight of about 23.5:76.5 or about 40:60. The SBRs are normally produced by emulsion polymerization in water.

Another group of suitable polymers are the polyethylene homopolymers and copolymers. A radical polymerization of ethylene is carried out, for example, by high-pressure polymerization to LDPE under pressures of about 1,400 to 3,500 bar and at temperatures of 150 to 350° C. The reaction is initiated by oxygen or peroxides. Suitable comonomers are linear or branched α,β-unsaturated olefins.

Another group of suitable polymers are the polyacrylates or the polymethacrylates or copolymers of polyacrylates and polymethacrylates. The polymers mentioned may optionally contain small amounts (up to about 10%) of free acrylic or methacrylic acid groups.

Also suitable as polymers in component A are the polyurethanes obtainable by polyaddition of polyisocyanates containing corresponding groups with a functionality of at least two to isocyanate groups.

Polyurethanes are obtainable, for example, by reacting i) polyisocyanates with
ii) polyols and
iii) optionally compounds containing primary and/or secondary amino groups and optionally other functional groups which have a functionality of one or more to isocyanates and
iv) optionally compounds containing at least one isocyanate-reactive group and at least one group ionizable by addition of a base or an acid or by quaternization.

Suitable polyurethanes may be dispersible, for example, in the presence of an emulsifier although they may also be substantially self-dispersible in water.

In the context of the invention, "polyurethanes substantially self-dispersible in water" are understood to be polyurethanes which can be dispersed in water by addition of only small quantities of dispersion aids or even without the addition of any dispersion aids at all. Polyurethanes such as these require at most an addition of dispersion aids of about 5% by weight, preferably less than 3% by weight and more preferably less than 1% by weight, based on dispersion dry weight and, more particularly, based on the weight of the binders in the dispersion.

Binders or polymeric binders in the context of the invention are understood to be those polymeric constituents of the polyurethanes which are involved in the formation of the dry coating or bond and which provide the coating or bond with mechanical stability.

Organic solvents with a boiling point above 100° C. (for example N,N-dimethyl formamide (DMF), N,N-dimethylacetamide (DMAc) or N-methylpyrrolidone (NMP) may be present in the polyurethane dispersions in small quantities, for example in a quantity of at most about 15% by weight, preferably in a quantity of less than 10% by weight and more preferably in a quantity of less than 8% by weight, based on the dispersion as a whole.

The polyisocyanates typically used in polyurethane chemistry may be used as component i) for the production of the polyurethanes according to the invention.

Particularly suitable polyisocyanates are diisocyanates $X(NCO)_2$, where X is an aliphatic hydrocarbon radical containing 4 to 12 carbon atoms, a cycloaliphatic or aromatic hydrocarbon radical containing 6 to 15 carbon atoms or an araliphatic hydrocarbon radical containing 7 to 15 carbon atoms. Examples of such diisocyanates are tetramethylene diisocyanate, hexamethylene diisocyanate, dodecamethylene diisocyanate, 1,4-diisocyanatocyclohexane, 1-isocyanato-3,3,5-trimethyl-5-isocyanatomethyl cyclohexane (IPDI), 2,2-bis-(4-isocyanatocyclohexyl)-propane, trimethylhexane diisocyanate, 1,4-diisocyanatobenzene, 2,4-diisocyanatotoluene, 2,6-diisocyanatotoluene, 4,4'-diisocyanatodiphenyl methane, tetramethyl xylylene diisocyanate (TMXDI), 2,4'-diisocyanatodiphenyl methane, p-xylylene diisocyanate, the somers of bis-(4-isocyanatocyclohexyl)-methane, such as the trans/trans, the cis/cis and the cis/trans isomer, and mixtures of these compounds.

Suitable mixtures of these isocyanates are, in particular, mixtures of the respective structural isomers of diisocyanatotoluene and diisocyanatodiphenylmethane, more especially the mixture of 80 mol-% 2,4-diisocyanatotoluene and 20 mol-% 2,6-diisocyanatotoluene. Mixtures of aromatic isocyanates, such as 2,4-diisocyanatotoluene and/or 2,6-diisocyanatotoluene, with aliphatic or cycloaliphatic isocyanates, such as hexamethylene diisocyanate or IPDI, are also particularly advantageous, the preferred mixing ratio of aliphatic to aromatic isocyanates being about 4:1 to 1:4.

In order to produce polyurethanes with a certain degree of branching or crosslinking, trifunctional and/or tetrafunctional isocyanates, for example, may be used. Such isocyanates are obtained, for example, by reacting difunctional isocyanates with one another in such a way that their isocyanate groups are partly derivatized to allophanate, biuret or isocyanurate groups. Commercially available compounds are, for example, the isocyanurate or the biuret of hexamethylene diisocyanate.

Other suitable polyisocyanates of relatively high functionality are, for example urethane polyisocyanates based on 2,4- and/or 2,6-diisocyanatotoluene, IPDI or tetramethylene diisocyanate on the one hand and low molecular weight polyhydroxy compounds, such as trimethylol propane, on the other hand.

For good film formation and elasticity, component ii) may be selected, for example, from relatively high molecular weight polyols, preferably diols, with a molecular weight of, for example, about 500 to 5,000 or about 1,000 to about 3,000 g/mol.

The polyols of component ii) are, for example, polyesterpolyols which are known, for example, from Ullmanns Enzyklopädie der technischen Chemie, 4th Edition, Vol. 19, pp. 62–65. Preferred polyesterpolyols are obtained by reaction of dihydric alcohols with polybasic, preferably dibasic polycarboxylic acids. The polycarboxylic acids may be aliphatic, cycloaliphatic, araliphatic, aromatic or heterocyclic and may optionally be substituted, for example by halogen atoms, and/or unsaturated. Examples of such polycarboxylic acids are suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid and/or dimeric fatty acids. The polycarboxylic acids mentioned may be used either individually as sole acid component or in admixture with one another for the synthesis of component i). Preferred carboxylic acids correspond to the general formula HOOC—$(CH_2)_y$—COOH, where y is a number of 1 to 20, preferably an integer of 2 to 20, for example succinic acid, adipic acid, dodecanedicarboxylic acid and sebacic acid. Instead of the free polycarboxylic acids, the corresponding polycarboxylic anhydrides or corresponding polycarboxylic acid esters of lower alcohols or mixtures thereof may also be used for the production of the polyester polyols.

Suitable polyhydric alcohols for reaction with the polycarboxylic acid component for the synthesis of component i) are, for example, ethylene glycol, propane-1,2-diol, propane-1,3-diol, butane-1,3-diol, butene-1,4-diol, butine-1,4-diol, pentane-1,5-diol, hexane-1,6-diol, neopentyl glycol, bis-(hydroxymethyl)-cyclohexanes, such as 1,4-bis-(hydroxymethyl)-cyclohexane, 2-methylpropane-1,3-diol, methyl pentanediols, also diethylene glycol, triethylene glycol, tetraethylene glycol, polyethylene glycol, dipropylene glycol, polypropylene glycols, dibutylene glycol and polybutylene glycol. Preferred polyhydric alcohols are neopentyl glycol and alcohols with the general formula HO—$(CH_2)_x$—OH, where x is a number of 1 to 20, preferably an integer of 2 to 20. Examples of such alcohols are ethylene glycol, butane-1,4-diol, hexane-1,6-diol, octane-1,8-diol and dodecane-1,12-diol.

Also suitable are polyetherdiols, preferably polyoxyethylene alcohols with a molecular weight of at least about 150, preferably at least about 200, which integrate hydrophilic sections into the polyester and optionally provide for self-dispersibility of the polyester or the polyurethane produced therefrom or at least facilitate dispersibility.

Also suitable as component ii) are polycarbonate diols which may be obtained, for example, by reacting phosgene with an excess of the low molecular weight alcohols mentioned as synthesis components for the polyesterpolyols.

Lactone-based polyesterdiols are also suitable as component ii). Lactone-based polyesterdiols are homopolymers or copolymers of lactones, preferably hydroxyl-terminated products of the addition of lactones onto suitable difunctional starter molecules. Examples of suitable lactones are ε-caprolactone, β-propiolactone, γ-butyrolactone and/or methyl-ε-caprolactone and mixtures thereof. Suitable starter components are, for example, the low molecular weight dihydric alcohols mentioned above as synthesis component for the polyester polyols. Low molecular weight polyester diols or polyether diols may also be used as starters for the production of the lactone polymers. Instead of the lactone polymers, the corresponding chemically equivalent polycondensates of the hydroxy-carboxylic acids corresponding to the lactones may also be used.

The polyester polyols may also be synthesized with the assistance of small quantities of monofunctional monomers and/or monomers of higher functionality.

In addition, polyether diols may be used as component ii). They may be obtained in particular by polymerization of ethylene oxide, propylene oxide, butylene oxide, tetrahydrofuran, styrene oxide or epichlorohydrin on their own, for example in the presence of $BF_3$, or by addition of these compounds—optionally in admixture or successively—onto starter components containing reactive hydrogen atoms, such as water, alcohols or amines, for example ethylene glycol, propane-1,2-diol, propane-1,3-diol, 1,2-bis-(4-hydroxydiphenyl)-propane or aniline.

Where suitable polyethers containing polyoxyethylene units with a molecular weight of at least about 150 and preferably of at least about 200 are used for the production of the polyurethanes, it is possible to produce polyurethanes self-dispersible in water which do not require the use of other hydrophilic structural units in the polyurethane.

Alcohols with a functionality of more than two may be used in small quantities both for the production of the polyester polyols and for the production of the polyether polyols. More particularly, compounds such as these are, for example, trimethylolpropane, pentaerythritol, glycerol, sugars, such as glucose for example, oligomerized polyols such as, for example, dimeric or trimeric ethers of trimethylolpropane, glycerol or pentaerythritol, partly esterified polyhydric alcohols of the above-described form, such as for example partly esterified trimethylolpropane, partly esterified glycerol, partly esterified pentaerythritol, partly esterified polyglycerol and the like, monobasic aliphatic carboxylic acids preferably being used for esterification. The hydroxyl groups of the polyols may optionally be etherified by reaction with alkylene oxides. The above-mentioned compounds are also suitable as starter components for the synthesis of the polyether polyols.

The polyol compounds with a functionality of >2 are preferably used in only small quantities for the synthesis of the polyester polyols or polyether polyols.

Polyhydroxyolefins, preferably those containing two terminal hydroxyl groups, for example α,ω-dihydroxypolybutadiene, α,ω-dihydroxypolymethacrylates or α,ω-dihydroxypolyacrylates, are also suitable for use as component ii).

The polyols listed above as suitable for use as component ii) may also be used in the form of mixtures in any ratios.

The hardness and the elasticity modulus of the polyurethanes may be further increased by using other low molecular weight diols or polyols as polyols.

The other polyols used are, above all, the abovementioned short-chain alkanediols, preferably neopentyl glycol and the unbranched $C_{2-12}$ diols, such as for example ethylene glycol, butane-1,4-diol, pentane-1,5-diol or hexane-1,6-diol.

The components described for the production of the polyurethane dispersions may also be used in the form of mixtures for the purposes of the invention.

Component iii) may be selected, for example, from chain extenders or more than difunctional compounds suitable for introducing branches which contain at least one primary or secondary amino group or—where more than one amino group per molecule is present—both primary and secondary amino groups.

Besides the amino groups, the compounds of component iii) may contain other functional groups, more particularly isocyanate-reactive groups. These include, in particular, the hydroxyl group or the mercapto group.

The compounds suitable for use as component iii) in accordance with the invention include, for example, monoaminoalcohols containing an aliphatically bound hydroxyl group, such as ethanolamine, N-methylethanolamine, N-ethylethanolamine, N-butylethanolamine, N-cyclohexylethanolamine, N-tert.butyl ethanolamine, leucinol, isoleucinol, valinol, prolinol, hydroxyethyl aniline, 2-(hydroxymethyl)-piperidine, 3-(hydroxymethyl)-piperidine, 2-(2-hydroxyethyl)-piperidine, 2-amino-2-phenylethanol, 2-amino-1-phenylethanol, ephedrine, p-hydroxyephedrine, norephedrine, adrenalin, noradrenalin, serine, isoserine, phenylserine, 1,2-diphenyl-2-aminoethanol, 3-amino-1-propanol, 2-amino-1-propanol, 2-amino-2-methyl-1-propanol, isopropanolamine, N-ethyl isopropanolamine, 2-amino-3-phenylpropanol, 4-amino-1-butanol, 2-amino-1-butanol, 2-aminoisobutanol, neopentanolamine, 2-amino-1-pentanol, 5-amino-1-pentanol, 2-ethyl-2-butyl-5-aminopentanol, 6-amino-1-hexanol, 2-amino-1-hexanol, 2-(2-aminoethoxy)-ethanol, 3-(aminomethyl)-3,5,5-trimethyl cyclohexanol, 2-aminobenzyl alcohol, 3-aminobenzyl alcohol, 3-amino-5-methyl benzyl alcohol, 2-amino-3-methyl benzyl alcohol.

If component iii) is to be used, for example, to produce chain branches, it is possible, for example, to use monoaminopolyols containing two aliphatically bound hydroxyl groups, such as 1-aminopropane-2,3-diol, 2-aminopropane-1,3-diol, 2-amino-2-methylpropane-1,3-diol, 2-amino-2-ethylpropane-1,3-diol, 2-amino-1-phenylpropane-1,3-diol, diethanolamine, diisopropanolamine, 3-(2-hydroxyethylamino)-propanol and N-(3-hydroxypropyl)-3-hydroxy-2,2-dimethyl-1-amino groups.

Polyamines may also be used as component iii). Examples of suitable polyamines include such compounds as hydrazine, ethylenediamine, 1,2- and 1,3-propylenediamine, butylenediamines, pentamethylenediamines, hexamethylenediamines such as, for example, 1,6-hexamethylenediamine, alkyl hexamethylenediamines such as, for example, 2,4-dimethyl hexamethylenediamine, generally alkylenediamines containing up to about 44 carbon atoms, including cyclic or polycyclic alkylenediamines which may be obtained, for example, from the dimerization products of unsaturated fatty acids in known manner. Also usable, but not preferred, are aromatic diamines such as, for example, 1,2-phenylenediamine, 1,3-phenylenediamine or 1,4-phenylenediamine. Higher amines such as, for example, diethylenetriamine, aminomethyl diamino-1,8-octane and triethylenetetramine may also be used in accordance with the invention.

Besides components i), ii) and iii), compounds containing at least one isocyanate-reactive group and at least one group ionizable by addition of a base or an acid or by quaternization or a group already ionized by such a reaction may be used as component iv) in the production of polyurethanes. In the following text, the terms "anionic groups" and "cationic groups" are used synonymously both for the groups ionized by addition of a base or an acid or by quaternization and for the free acids or free bases unless otherwise stated.

The contribution of components containing anionic or cationic groups to the total quantity of components is generally gauged so that the molar quantity of anionic or cationic groups, based on the quantity by weight of all the components used, is between 30 and 1,000, preferably between 50 and 600 and more preferably between 80 and 500 mmol/kg.

Above all, compounds bearing anionic groups, such as compounds bearing sulfonate, carboxylate and phosphonate groups, are incorporated in the polyurethane as component iv). The anionic groups are particularly suitable either in the form of the free acid or preferably in the form of their alkali metal or ammonium groups, more particularly protonated tertiary amino groups or quaternary ammonium groups.

Suitable monomers containing anionic groups are normally aliphatic, cycloaliphatic, araliphatic or aromatic carboxylic acids and sulfonic acids which carry at least one alcoholic hydroxyl group or at least one primary or secondary amino group. The hydroxyalkyl carboxylic acids, above all those containing 3 to 10 carbon atoms, are preferred. Dimethylolpropionic acid (DMPA) is particularly preferred.

Of particular practical importance as component iv) bearing cationic groups are, above all, compounds containing tertiary amino groups, for example tris-(hydroxyalkyl)-amines, N,N'-bis-(hydroxyalkyl)-alkylamines, N-hydroxyalkyl dialkylamines, tris-(aminoalkyl)-amines, N,N'-bis-(aminoalkyl)-alkylamines, N-aminoalkyl dialkylamines, the alkyl groups and alkanediyl units of these tertiary amines independently of one another consisting of one to six carbon atoms. Also suitable are polyethers containing tertiary nitrogen atoms and preferably two terminal hydroxy groups which can be obtained in known manner, for example by alkoxylation of amines containing two hydrogen atoms attached to amine nitrogen, for example methylamine, aniline or N,N'-dimethylhydrazine. Polyethers such as these generally have a molecular weight of 500 to 6,000 g/mol.

These tertiary amines are converted into the ammonium salts either with acids, preferably strong mineral acids, such as phosphoric acid, sulfuric acid, hydrohalic acids, or with strong organic acids, such as formic acid or acetic acid for example, or by reaction with suitable quaternizing agents, such as $C_{1-6}$ alkyl halides, for example alkyl bromides or chlorides.

According to the invention, the polymers mentioned may be present in the polymer dispersion according to the invention both individually and in the form of mixtures of two or more thereof.

In a preferred embodiment of the invention, a copolymer of vinyl acetate and ethylene (EVA copolymer) is used as the organic polymer. In another preferred embodiment of the invention, the polymer dispersion contains polyvinyl acetate or polyacrylate, more especially polybutyl acrylate, or a mixture of polyvinyl acetate and polyacrylate.

In another preferred embodiment of the present invention, polymer dispersions containing at least one of the above-mentioned polymers with a molecular weight ($M_w$) of at least about 50,000 are used as component A.

Dispersions suitable for the purposes of the invention contain, for example, copolymers of vinyl acetate, ethylene and vinyl versatate. These copolymers are produced, for example, by copolymerization of about 50 to about 75% by weight of vinyl acetate, about 5 to about 13% by weight of ethylene and about 5 to about 30% by weight of vinyl versatate. Copolymers of styrene and butyl acrylate are also suitable. These copolymers are produced, for example, by copolymerization of about 25 to about 75% by weight of styrene and about 25 to about 75% by weight of butyl acrylate. Other suitable copolymers are copolymers of styrene and butadiene. Copolymers such as these are produced, for example, by copolymerization of about 25 to about 75% by weight of styrene and about 25 to about 75% by weight of butadiene, copolymers with a glass transition temperature $T_g$ of at least about 15° C. or at least about 20° C., for example at least about 25° C., being preferred. The solids contents of the dispersions usable in accordance with the invention is from about 45 to about 70% by weight. The use of a dispersion of a copolymer of vinyl acetate, ethylene and vinyl versatate is particularly preferred.

A polymer dispersion usable as component A contains the polymers mentioned in a quantity of at least about 30% by weight. In a preferred embodiment of the present invention, the percentage content of such polymers is at least about 45% by weight or at least about 50% by weight. However, the content of such polymers may also be higher, for example at least about 55% by weight or at least about 65% by weight or higher, for example at least about 70% by weight or at least about 75% by weight. In a particularly preferred embodiment of the present invention, the percentage content of the polymers mentioned is about 50 to 70% by weight.

Besides the organic polymers obtainable by emulsion polymerization mentioned thus far, a polymer dispersion suitable for use as component A in accordance with the invention may also contain one or more additives. Suitable additives are, for example, protective colloids, antioxidants, pigments, fillers, plasticizers, preservatives, defoamers, film forming aids, perfumes, coupling agents, solvents, dyes, flameproofing agents, flow controllers, tackifiers, viscosity adjusters, dispersion aids, emulsifiers or thickeners or a mixture of two or more of the additives mentioned.

Component A may contain, for example, a protective colloid or a mixture of two or more protective colloids as additive. Suitable protective colloids are, for example, etherified cellulose derivatives, such as hydroxyethyl cellulose, hydroxypropyl cellulose or carboxymethyl cellulose. Other suitable protective colloids are polyvinyl pyrrolidone or polycarboxylic acids, such as polyacrylic acid or polymethacrylic acid, optionally in the form of their copolymers with optionally OH-functional esters of acrylic or methacrylic acid, and copolymers of maleic acid or maleic anhydride with other ethylenically unsaturated compounds, such as methylvinylether or styrene. For example, polyvinyl alcohol, more especially polyvinyl alcohol with a degree of hydrolysis of about 30 to about 100% by weight, for example about 60 to about 98% by weight or about 70 to about 88% by weight, or a mixture of two or more such polyvinyl alcohols, may be used as the protective colloid. As described above, the protective colloids used in the polymer dispersions usable as component A may be used individually. However, a mixture of two or more of the protective colloids mentioned may also be used in accordance with the invention.

The total percentage content of the protective colloid(s) in the polymer dispersion used as component A is up to about 20% by weight, for example about 0.1 to about 15 or about 1 to about 10% by weight.

Suitable antioxidants are, for example, phosphorous acid and salts thereof, hypophosphorous acid and salts thereof, ascorbic acid and derivatives thereof (more particularly ascorbyl palmitate), tocopherol and derivatives thereof, mixtures of ascorbic acid derivatives and tocopherol derivatives, sterically hindered phenol derivatives, more especially BHA (tert.butylene-4-methoxyphenol) and BHT (2,6-di-tert.butylene-4-methylphenol), gallic acid and derivatives thereof, particularly alkyl gallates, aromatic amines, such as diphenylamine, naphthylamine or 1,4-phenylenediamine, dihydroquinoline, organic sulfides and polysulfides, dithiocarbamates and mercaptobenzimidazole.

Suitable viscosity adjusters are, for example, cellulose ethers, hydrogenated castor oil, highly disperse silicas and ionic or nonionic thickeners, such as polyacrylic acid, or associative thickeners.

The plasticizers used are, for example, plasticizers based on phthalic acid, more particularly dialkyl phthalates, preferred plasticizers being phthalic acid esters esterified with a linear alkanol containing about 6 to about 12 carbon atoms.

Other suitable plasticizers are benzoate plasticizers, for example sucrose benzoate, diethylene glycol dibenzoate and/or diethylene glycol benzoate, where about 50 to 95% of all the hydroxyl groups have been esterified, phosphate plasticizers, for example t-butylphenyl diphenyl phosphate, polyethylene glycols and derivatives thereof, for example diphenyl ethers of poly(ethyleneglycol), liquid resin derivatives, for example the methyl ester of hydrogenated resin, vegetable and animal oils, for example glycerol esters of fatty acids and polymerization products thereof.

The stabilizers or antioxidants usable as additives in accordance with the invention include hindered phenols of high molecular weight ($M_n$), polyhydric phenols and sulfur- and phosphorus-containing phenols. Phenols suitable as additives for the purposes of the invention are, for example, 1,3,5-trimethyl-2,4,6-tris-(3,5-di-tert.butyl-4-hydroxybenzyl)-benzene; pentaerythritol tetrakis-3-(3,5-di-tert.butyl-4-hydroxyphenyl)-propionate; n-octadecyl-3,5-di-tert.butyl-4-hydroxyphenyl)-propionate; 4,4-methylenebis-(2,6-di-tert.butylphenol); 4,4-thiobis-(6-tert.butyl-o-cresol); 2,6-di-tert.butylphenol; 6-(4-hydroxyphenoxy)-2,4-bis-(n-octylthio)-1,3,5-triazine; di-n-octadecyl-3,5-di-tert.butyl-4-hydroxybenzyl phosphonates; 2-(n-octylthio)-ethyl-3,5-di-tert.butyl-4-hydroxybenzoate and sorbitol hexa-[3-(3,5-ditert.butyl-4-hydroxyphenyl)-propionate].

Suitable photostabilizers are, for example, those which are commercially obtainable as Tinuvin® (manufacturer: Ciba Geigy).

Suitable fillers or pigments are, for example, chalk, heavy spar, kaolin, carbon black, gypsum, Aerosil, silica gel, graphite, metal oxides of aluminium, iron, zinc, titanium, chromium, cobalt, nickel, manganese and the like. Also suitable are the mixed oxides, chromates, molybdates, carbonates, silicates, aluminates and sulfates of the above-mentioned elements. Other suitable fillers are native or synthetic fibers, cellulose, wood chips, phthalocyanines or silica flour. The fillers and pigments mentioned may be used individually or in the form of a mixture of two or more thereof.

The adhesive system according to the invention contains as component B a dispersion of a drying agent in an oil phase liquid at 23° C., the oil phase containing at least 0.1% by weight of a compound liquid at 23° C. which is soluble in the oil phase and which contains at least one covalent single, double or triple bond between a carbon atom and a hetero atom or a mixture of two or more such compounds.

In the context of the invention, the term "oil phase" encompasses a continuous phase of one or more compounds liquid at 23° C. which are immiscible or substantially immiscible with water. Poor miscibility with water is present when a mixture of water and the corresponding oil phase undergoes phase separation, the separate phases each containing small quantities of the compound representing the other phase or the corresponding mixture of two or more such compounds in dissolved form. In a preferred embodiment of the present invention, an "oil phase" only contains compounds which have a solubility in water at 23° C. of less than 1 g/l.

According to the present invention, the oil phase of the dispersion used as component B contains a compound which has at least one covalent single, double or triple bond between a carbon atom and a hetero atom. The term "hetero atom" as used in the present text encompasses any atoms which are capable of entering into a covalent single, double or triple bond with a carbon apart from hydrogen and carbon itself. In a preferred embodiment of the present invention, O, N, S and P in particular are termed hetero atoms. Such compounds are also referred to as polar compounds in the present text.

In a preferred embodiment of the invention, the oil phase contains polar compounds of which the polarity exceeds the polarity of normal hydrocarbon oils, for example paraffin oil or oils based on aromatic hydrocarbons or mixtures thereof. The term "polarity" relates to the polarity of the entire oil phase. If the oil phase only consists of a single compound, the polarity of the oil phase corresponds to the polarity of the corresponding compound. If the oil phase contains two or more compounds which are liquid at a temperature of 23° C., the polarity of the oil phase as defined for the purposes of the present invention corresponds to the weighted average of the particular compounds forming the oil phase.

In another preferred embodiment of the present invention, the oil phase contains at least one polar compound which has one carbonyl group or two or more carbonyl groups, one ester group or two or more ester groups or one ether group or two or more ether groups or one OH group or two or more OH groups or a mixture of two or more of the groups mentioned.

In another preferred embodiment of the present invention, the oil phase contains a compound with at least two ester groups or at least two ether groups or at least one ester group and at least one ether group or at least two ester groups and one ether group or at least two ether groups and one ester group or at least three ester groups as the polar compound.

In another preferred embodiment of the present invention, the percentage content of the polar compound or the mixture of two or more polar compounds in the oil phase as a whole is at least about 30% by weight, for example at least about 50% weight, at least about 70% by weight or at least about 90% by weight. In another embodiment of the invention, the oil phase consists essentially of a polar compound or a mixture of two or more polar compounds corresponding to the above definition.

Any compounds immiscible or substantially immiscible with water are suitable as the oil phase or as a constituent of the oil phase. Suitable compounds are, for example, hydrocarbon oils, such as paraffin oils or aromatic hydrocarbon oils or mixtures thereof. Natural oils or fats or mixtures are also suitable as the oil phase or at least as a constituent of the oil phase, providing the corresponding compounds or mixtures are liquid at 23° C. Fatty compounds are also suitable.

"Fatty compounds" in the context of the invention include fatty acids, fatty alcohols and derivatives thereof providing they contain at least one of the functional groups mentioned above. Their molecular weight is generally above 100 and, more particularly, above 200. The upper limit is 20,000 and preferably between 300 and 1,500. The percentage by weight of the polyether in the reaction product of ethylene oxide or propylene oxide with the fatty compound is 1:0.01 to 3 and preferably 1:0.1 to 2.

"Fatty acids" in the context of the invention are understood to be acids which contain one or more carboxyl groups (—COOH). The carboxyl groups may be attached to saturated, unsaturated, unbranched or branched alkyl groups containing more than 8 and, in particular, more than 12 carbon atoms. Besides the —OH, —SH, —C=C—, —COOH, amino, anhydride or epoxide groups mentioned above, they may contain other groups, such as ether, ester, halogen, amide, amino, urethane and urea groups. However, carboxylic acids, such as native fatty acids or fatty acid mixtures, dimer fatty acids and trimer fatty acids, are preferred. Actual examples of the fatty acids besides the saturated fatty acids are, in particular, the monounsaturated or polyunsaturated acids palmitoleic acid, oleic acid, elaidic acid, petroselic acid, erucic acid, ricinoleic acid, hydroxymethoxy-stearic acid, 12-hydroxystearic acid, linoleic acid, linolenic acid and gadoleic acid.

Polyhydroxyfatty acids may also be used in addition to the naturally occurring fatty acids. They may be obtained, for example, by epoxidation of unsaturated fats and oils or esters of fatty acids with alcohols, ring opening with H-active compounds, for example alcohols, amines and carboxylic acids, and subsequent saponification. The fats and oils required as starting material may be both of vegetable origin and of animal origin or may optionally be synthesized by petrochemical methods.

The fatty acids may also be derived from oil- and fat-based raw materials obtainable, for example, by ene reactions, Diels-Alder reactions, transesterification reactions, condensation reactions, grafting reactions (for example with maleic anhydride or acrylic acid etc.) and epoxidation reactions. Examples of such raw materials are a) epoxides of unsaturated fatty acids, such as palmitoleic acid, oleic acid, elaidic acid, petroselic acid, erucic acid, linoleic acid, linolenic acid, gadoleic acid, b) reaction products of unsaturated fatty acids with maleic acid, maleic anhydride, methacrylic acid or acrylic acid, c) condensation products of hydroxycarboxylic acids, such as ricinoleic acid or 12-hydroxystearic acid, and polyhydroxycarboxylic acids.

Not all the fatty acids described above are stable at room temperature. If necessary, therefore, derivatives of the above-mentioned fatty acids, such as esters or amides, may be used in accordance with the invention.

A preferred embodiment of the invention is characterized by the use of esters or partial esters of the above-mentioned fatty acids with monohydric or polyhydric alcohols. "Alcohols" in the context of the invention are understood to be hydroxyl derivatives of aliphatic and alicyclic saturated, unsaturated, unbranched or branched hydrocarbons. Besides monohydric alcohols, these alcohols also include the low molecular weight hydroxyl-containing chain extending or crosslinking agents known per se from polyurethane chemistry. Specific examples from the low molecular weight range are methanol, ethanol, propanol, butanol, pentanol, decanol, octadecanol, 2-ethylhexanol, 2-octanol, ethylene glycol, propylene glycol, trimethylene glycol, tetramethylene glycol, 2,3-butylene glycol, hexamethylene diol, octamethylene diol, neopentyl glycol, 1,4-bis-hydroxymethyl cyclohexane, Guerbet alcohol, 2-methylpropane-1,3-diol, hexane-1,2,6-triol, glycerol, trimethylol propane, trimethylol ethane, pentaerythritol, sorbitol, formitol, methyl glycoside, butylene glycol, dimer and trimer fatty acids reduced to alcohols. Alcohols derived from rosins, such as abietyl alcohol, may also be used for the esterification reaction.

The alcohols may even be replaced by OH-containing tertiary amines, polyglycerol or partly hydrolyzed polyvinyl esters.

In addition, polycarboxylic acids or hydroxycarboxylic acids may be added for the oligomerization reaction. Examples of such acids are oxalic acid, malonic acid, succinic acid, maleic acid, fumaric acid, glutaric acid, adipic acid, suberic acid, sebacic acid, 1,11-undecanedioic acid, 1,12-dodecanedioic acid, phthalic acid, isophthalic acid, terephthalic acid, hexahydrophthalic acid, tetrahydrophthalic acid or dimer fatty acid, trimer fatty acid, citric acid, lactic acid, tartaric acid, ricinoleic acid, 12-hydroxystearic acid. Adipic acid is preferably used.

Besides the partly saponified fats, such as glycerol monostearate, examples of suitable esters are—preferably—the natural fats and oils of new rape, sunflowers, soya, flax, castor beans, coconuts, oil palms, oil palm kernels and olive trees and methyl esters thereof. Preferred fats and oils are, for example, beef tallow with a chain distribution of 67% oleic acid, 2% stearic acid, 1% heptadecanoic acid, 10% saturated $C_{12}$–$C_{16}$ acids, 12% linoleic acid and 2% saturated acids containing more than 18 carbon atoms or, for example, the oil of new sunflowers (NSf) with a composition of about 80% oleic acid, 5% stearic acid, 8% linoleic acid and about 7% palmitic acid. The corresponding epoxides and reaction products with maleic anhydride, for example, may of course also be used. Other examples are partly and completely dehydrated castor oil, partly acetylated castor oil, ring opening products of epoxidized soybean oil with dimer fatty acids.

Fatty acid esters and derivatives thereof obtainable by epoxidation may also be used. Examples of such esters include soya fatty acid methyl ester, linseed oil fatty acid methyl ester, ricinoleic acid methyl ester, epoxystearic acid methyl ester, epoxystearic acid-2-ethylhexyl ester. Preferred glycerides are the triglycerides, for example rapeseed oil, linseed oil, soybean oil, castor oil, partly and completely dehydrated castor oils, partly acetylated castor oil, soybean oil epoxide, linseed oil epoxide, rapeseed oil epoxide, epoxidized sunflower oil.

In addition, the corresponding partial epoxides of the compounds mentioned may also be used providing the partial epoxides at least predominantly still have at least one olefinically unsaturated double bond.

In a preferred embodiment of the invention, an unsaturated fatty acid ester or derivative obtainable by epoxidation or a mixture of two or more such compounds is used as component A. Examples of such fatty acids are soybean oil fatty acid methyl ester, linseed oil fatty acid methyl ester, ricinoleic acid methyl ester, epoxystearic acid methyl ester or epoxystearic acid-2-ethylhexyl ester.

Nucleophiles in the context of the present invention are understood to be such alcohols as methanol, ethanol, ethylene glycol, glycerol or trimethylol propane or amines such as, for example, ethanolamine, diethanolamine, triethanolamine, ethylenediamine or hexamethylenediamine or carboxylic acids such as acetic acid, the above-mentioned fatty acids, dimer fatty acid, maleic acid, fumaric acid or the above-mentioned dibasic or polybasic, saturated or unsaturated di- and polycarboxylic acids, phthalic acid or a mixture of two or more thereof or a mixture of two or more $C_{6-36}$ fatty acids. Examples of such compounds are ring opening products of epoxidized, unsaturated fatty acids or fats or oils, for example soybean oil, with carboxylic acids, for example with one or more of the above-mentioned fatty acids.

The fats and oils (triglycerides) may be used both in native form and after thermal and/or oxidative treatment or in the form of the derivatives obtainable by epoxidation or by the addition of maleic anhydride or acrylic acid. Specific examples are palm oil, peanut oil, rapeseed oil, cottonseed oil, soybean oil, castor oil, partly and completely dehydrated castor oils, partly acetylated castor oils, sunflower oil, linseed oil, stand oils, blown oils, epoxidized linseed oil, rapeseed oil, coconut oil, palm kernel oil and tallows.

Other suitable derivatives are amides of the above-mentioned fatty acids. They may be obtained by reaction with primary and secondary amines or polyamines, for example with monoethanolamine, diethanolamine, ethylenediamine, hexamethylenediamine, ammonia, but must still contain nucleophilic groups for the reaction with the alkylene oxides.

"Fatty alcohols" in the context of the invention are understood to be compounds which contain one or more hydroxyl groups. The hydroxyl groups may be attached to saturated, unsaturated, unbranched or branched alkyl groups containing more than 8 carbon atoms and, in particular, more than 12 carbon atoms. Besides the —SH, —C=C—, —COOH, amino, anhydride or epoxide groups required for the subsequent reaction with the alkylene oxides, they may contain other groups, for example ether, ester, halogen, amide, amino, urea and urethane groups. Actual examples of the fatty alcohols according to the invention are ricinoleyl alcohol, 12-hydroxystearyl alcohol, oleyl alcohol, erucyl alcohol, linoleyl alcohol, linolenyl alcohol, arachidyl alcohol, gadoleyl alcohol, erucyl alcohol, brassidyl alcohol, dimer diol (=hydrogenation product of dimer fatty acid methyl ester).

Symmetrical and non-symmetrical ethers and esters with mono- or polycarboxylic acids may be used as derivatives of the fatty alcohols. Monocarboxylic acids are understood to include formic acid, acetic acid, propionic acid, butyric acid, valeric acid, caproic acid, oenanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachic acid, behenic acid, lignoceric acid, cerotic acid and melissic acid. Examples of polycarboxylic acids are oxalic acid, adipic acid, maleic acid, tartaric acid and citric acid. At the same time, the fatty acids described above, such as oleic acid oleyl ester for example, may also be used as the carboxylic acid.

The fatty alcohols may even be etherified, especially with polyhydric alcohols, for example alkyl polyglycosides and dimer diol ether. Mixtures of the above fatty compounds may of course also be used as starter molecules for the reaction with the alkylene oxides.

Also suitable as the oil phase are the esters of aliphatic or aromatic carboxylic acids, for example the esters of adipic acid, sebacic acid, citric acid, benzoic acid or the isomeric phthalic acids or mixtures thereof, providing the compounds or their mixtures are liquid at 23° C. Examples of such compounds are phthalic acid esters, adipic acid esters, sebacic acid esters or citric acid esters, polyester adipates, benzoic acid esters or rosin soft resin esters (liquid resins).

Hydrocarbon oils, such as paraffins, isoparaffins, aromatic and aliphatic oils and liquid hydrocarbon resins are also suitable as the oil phase.

The components B used in accordance with the invention in the adhesive systems according to the invention contain a drying agent or a mixture of two or more drying agents dispersed in the oil phase. According to the invention, suitable drying agents are any compounds which either enter into a chemical reaction with water that is substantially irreversible under the conditions prevailing during the reaction or which adsorb the water so that it is only released slowly, if at all, under the conditions prevailing during the adsorption process. The two types of drying agent mentioned are normally referred to as chemical drying agents and as physical drying agents.

Drying agents suitable for use in component B in accordance with the invention must enter into their reaction with water substantially irreversibly. "Irreversibly" in the context of the invention means that the chemical or physical reaction is substantially irreversible under the conditions the adhesive system can expect to encounter in use. Such conditions include, for example, a temperature range of about −30 to about 120° C. and more particularly about 0 to about 100° C. or about 10 to about 80° C. or about 20 to about 60° C. The reaction should also be irreversible under various air humidity conditions. Ideally, the chemical or physical reaction between water and the drying agent is substantially irreversible over a range of 0 to 100% relative air humidity.

Inorganic chemical drying agents include, in particular, drying agents which "set" with water (hydraulic binders). Hydraulic binders include, for example, the oxides of the alkali or alkaline earth metals, such as magnesium oxide, barium oxide, calcium oxide, sodium oxide, lithium oxide or potassium oxide. Other suitable hydraulic binders are cements which contain calcium silicates, calcium aluminates and calcium ferrites in varying composition. Suitable cements are, for example, blast furnace cement, trass cement, Portland oil shale cement, fly ash cement, phonolith cement, volcanic cement, sulfate slag cement, alumina cement, expanding cement or quick cement. Other suitable drying agents are the oxides of phosphorus and the polymeric phosphoric acids. Inorganic chemical drying agents also include compounds which react with water with incorporation of the water in their crystal lattice (formation of water of crystallization). Such compounds are, for example, magnesium sulfate, sodium sulfate, copper sulfate, calcium sulfate, magnesium carbonate, calcium chloride, potassium carbonate, magnesium perchlorate, ettringite and the like.

Suitable physical drying agents are, in particular, physical inorganic drying agents, for example zeolites, layered silicates, silica gels or montmorillonites of the type normally used as molecular sieves.

The dispersion of a drying agent in an oil phase usable as component B in accordance with the invention has a percentage drying agent content, based on component B as a whole, of at least about 0.1% by weight. Since components A and B are used by mixing to produce an adhesive, it is advisable for both components to be adapted to one another in their ingredients and, preferably, to be delivered together as a kit. Accordingly, the drying agent content of component B should preferably be gauged so that it is sufficient for drying component A, i.e. for taking up at least a proportion of the water present in component A sufficient for drying. It is not absolutely essential in this connection for all the water to be removed from component A. It may be sufficient to remove only a certain percentage of the water, for example about 50% by weight, about 70% by weight or about 90% by weight. In a preferred embodiment of the present invention, however, the percentage content of drying agent in component B is gauged so that substantially all the water in component A, i.e. at least about 95% by weight or at least about 99% by weight, can be bound. In a preferred embodiment of the invention, therefore, component B contains the drying agent in a quantity of about 20 to about 90% by weight, for example in a quantity of about 30 to about 80% by weight or about 40 to about 70% by weight. Depending on the composition of component A, the content of drying agent in component B can be, for example, about 40 to about 60% by weight.

Suitable components B are, for example, mixtures of ettringite-forming cement in castor oil (mixing ratio 5:1 to 1:5), white lime in epoxidized soybean oil (mixing ratio 5:1 to 1:5) or Portland cement in a mixture of diethylene glycol dibenzoate, triethylene glycol dibenzoate and dipropylene glycol dibenzoate.

According to the invention, component B may contain another additive or a mixture of two or more other additives. Other additives are, for example, protective colloids, antioxidants, pigments, fillers, preservatives, defoamers, film-forming aids, perfumes, coupling agents, solvents, dyes, flameproofing agents, flow controllers, tackifiers, viscosity and rheology adjusters, dispersion aids, emulsifiers, thickeners or antisedimenting agents.

In a preferred embodiment of the invention, the percentage content of such additives in component B as a whole can be up to at most about 30% by weight but is preferably lower, for example about 0.5 to about 10% by weight.

The above-mentioned components A and B may be used for the production of adhesives. Accordingly, the present invention also relates to a process for the production of an adhesive in which at least two components A and B are mixed, a) component A being an aqueous dispersion of a polymer obtainable by polyaddition or by polymerization of a monomer containing at least one olefinically unsaturated double bond or a mixture of two or more such monomers or an aqueous dispersion of a mixture of two or more such polymers and b) component B being a dispersion of a drying agent in an oil phase liquid at 23° C., the oil phase containing at least 0.1% by weight of a compound liquid at 23° C. which is soluble in the oil phase and which contains at least one covalent single, double or triple bond between a carbon atom and a hetero atom or a mixture of two or more such compounds.

Besides components A and B, other components may optionally be used for the production of the corresponding adhesive. These other components may be, for example, organic or inorganic additives, such as sand, granular plastics, powdered plastics, granular rubbers, powdered rubbers, glass granules or glass beads or a mixture of two or more of the additives mentioned.

Accordingly, the present invention also relates to an adhesive obtainable by mixing at least two components A and B, a) component A being an aqueous dispersion of a polymer obtainable by polyaddition or by polymerization of a monomer containing at least one olefinically unsaturated double bond or a mixture of two or more such monomers or an aqueous dispersion of a mixture of two or more such polymers and
b) component B being a dispersion of a drying agent in an oil phase liquid at 23° C., the oil phase containing at least 0.1% by weight of a compound liquid at 23° C. which is soluble in the oil phase and which contains at least one covalent single, double or triple bond between a carbon atom and a hetero atom or a mixture of two or more such compounds.

It has been found that combinations of component A and component B may also be used as adhesives providing component B has only a small content, if any, of polar compounds. Accordingly, the present invention also relates to the use of an adhesive system of at least two components A and B for the production of adhesives, a) component A being an aqueous dispersion of a polymer obtainable by polyaddition or by polymerization of a monomer containing at least one olefinically unsaturated double bond or a mixture of two or more such monomers or an aqueous dispersion of a mixture of two or more such polymers and
b) component B being a dispersion of a drying agent in an oil phase liquid at 23° C.

In a preferred embodiment of the use according to the invention, the oil phase contains at least 0.1% by weight of a compound liquid at 23° C. which is soluble in the oil phase and which contains at least one covalent single, double or triple bond between a carbon atom and a hetero atom or a mixture of two or more such compounds.

The adhesives obtainable by the process according to the invention are suitable for bonding substrates of the same kind or of different kinds. Suitable substrates are, for example, wood, cork, metal, plastics, textiles, stone, concrete and the like. In a preferred embodiment of the present invention, the adhesives are used for bonding water-sensitive substrates, for example for bonding parquet or laminate to floors in interior rooms.

Accordingly, the present invention also relates to the use of an adhesive according to the invention for bonding materials of wood, cork, metal, plastics, textiles, elastomers, stone or concrete.

The adhesives according to the invention are suitable both for bonding water-permeable substrates and for bonding water-impermeable substrates. Thus, besides the above-mentioned materials, plastic substrates for example, particularly in web or sheet form, for example elastomeric plastics, may be bonded. The adhesives according to the invention are particularly suitable for bonding elastomers to roofs or floors.

The invention is illustrated by the following Examples.

EXAMPLES

The following components A and B were used for the production of adhesives:

| Component A1: | dispersion of 65% by weight vinyl acetate, 10% by weight ethylene and 25% by weight vinyl versatate, solids content: ca. 60% |
|---|---|
| Component A2: | dispersion of 50% by weight styrene and 50% by weight butyl acrylate, solids content: ca. 50% |
| Component B1: | ettringite-forming cement in castor oil (mixing ratio 2:1) |
| Component B2: | white lime in epoxidized soybean oil (mixing ratio 2:1) |

Practical Examples

The following different adhesives were prepared from the above-described components A and B by mixing the corresponding quantities and the mixtures were evaluated:

| Adhesive No. | 1 | 2 | 3 | 4 |
|---|---|---|---|---|
| Comp. A1 | 33 g | 33 g | 33 g | |
| Comp. A2 | | | | 33 g |
| Comp. B1 | 67 g | | 67 g | 67 g |
| Comp. B2 | | 67 g | | |
| Rubber granules* | | | 3 g | |
| Miscibility | Good | Good | Very good | Very good |
| Spreadability | Good | Satisfactory | Good | Very good |

(*The rubber granules were added to component B1 before mixing of the two components)

Films were prepared from the adhesives and were evaluated on the basis of the following criteria:

| Adhesive No. | 1 | 2 | 3 | 4 |
|---|---|---|---|---|
| Elasticity* (1–6) | 2 | 5 | 3 | 5 |
| Tack* (1–6) | 3 | 6 | 2 | 6 |
| Hardness* (1–6) | 3 | 2 | 3 | 4 |
| Resilience* (1–6) | 1 | 2 | 1 | 3 |
| Exudation | No | No | No | No |

(*Scoring:
1 = very elastic, very tacky, very hard, high resilience
6 = inelastic, tack-free, soft, no resilience)

Commercial laminate was laid on cement screed slabs using the adhesives. Adhesion to the surface and to the substrate was good.

Insulating Properties of the Adhesive:

Test Arrangement:

Commercial laminate was laid on cement screed slabs:

a) loosely laid laminate on loose insulating layer of ethylene/vinyl acetate granules on the screed slab (standard procedure in about 90% of the laying of laminate)
b) direct bonding to the screed slab with a non-elastic polyurethane adhesive of the type typically used for bonding parquet and laminate (in about 9% of laminate applications)
c) bonding a solid-borne sound insulating layer (3 mm thick) of ethylene/vinyl acetate granules with the above-mentioned adhesive and then the laminate using the same adhesive (normal in about 1% of the applications)
d) direct bonding with the adhesive according to the invention (adhesive No. 1 in the above Examples)

Results of Room Sound Measurements Using a Hammer for Sound Generation:

a) measurable sound level 93 db
b) measurable sound level 89 db
c) measurable sound level 83 db
d) measurable sound level 83 db Laying the laminate loosely on a sound-insulating layer (a) produces the worst results. Even simple bonding (b) with commercially available products does not produce a clear advantage. Although bonding to the sound-insulating layer (c) has a good sound-insulating effect, it is complicated (2 steps) and expensive. Bonding with the adhesive (d) according to the invention produces a distinct gain in sound insulation and can be carried out in a single step. Accordingly, the adhesive according to the invention is simple and inexpensive to apply to all, nowadays generally loosely laid hard floors (for example laminate, ready-made parquet).

What is claimed is:

1. An adhesive composition comprising at least two separate components A and B, wherein:
   component A is an aqueous dispersion of a polymer obtainable by polyaddition or by polymerization of a monomer containing at least one olefinically unsaturated double bond or a mixture of two or more such monomers or an aqueous dispersion of a mixture of two or more such polymers; and
   component B is a dispersion of a drying agent in an oil phase liquid at 23° C., the oil phase containing at least 0.1% by weight of a polar compound liquid at 23° C. which is soluble in the oil phase and which contains at least one covalent single, double or triple bond between a carbon atom and a hetero atom or a mixture of two or more such polar compounds.

2. The adhesive composition of claim 1 wherein the oil phase contains at least 50% by weight of the polar compound or the mixture of two or more polar compounds.

3. The adhesive composition of claim 2 wherein the oil phase contains as the polar compound a compound containing one carbonyl group or two or more carbonyl groups, one ester group or two or more ester groups or one ether group or two or more ether groups or one OH group or two or more OH groups or a mixture of two or more of the foregoing groups.

4. The adhesive composition of claim 1 wherein the oil phase contains as the polar compound a compound containing at least two ester groups or at least two ether groups or at least one ester group and at least one ether group or at least two ester groups and one ether group or at least two ether groups and one ester group or at least three ester groups.

5. The adhesive composition of claim 1 wherein the oil phase contains at least 90% by weight of a polar compound or of a mixture of two or more polar compounds.

6. The adhesive composition of claim 1 wherein component B contains at least 30% by weight of drying agent.

7. The adhesive composition of claim 6 wherein the drying agent is an inorganic drying agent.

8. The adhesive composition of claim 1 wherein component A contains as the polymer a polymer obtainable by polymerization of acrylic acid or one or more acrylic acid derivatives, methacrylic acid or one or more methacrylic acid derivatives, ethylene, vinyl acetate, styrene or one or more styrene derivatives or by copolymerization of two or more of the foregoing compounds.

9. A process for the production of an adhesive which contains at least two components A and B of claim 1 comprising mixing the at least two components A and B.

10. An adhesive obtained by the process of claim 9.

11. A method of using a dispersion of a drying agent in an oil phase liquid at 23° C., the oil phase containing at least 0.1% by weight of a polar compound liquid at 23° C. which is soluble in the oil phase and which contains at least one covalent single, double or triple bond between a carbon atom and a hetero atom or a mixture of two or more such compounds, for the production of an adhesive.

12. A method of using the composition of claim 1 as an adhesive comprising applying the composition to a substrate.

13. The method of claim 12 wherein the oil phase contains at least 0.1% by weight of a polar compound liquid at 23° C. which is soluble in the oil phase and which contains at least one covalent single, double or triple bond between a carbon atom and a hetero atom or a mixture of two or more such compounds.

14. A method of using the adhesive composition of claim 1 for bonding materials selected from the group consisting of wood, cork, metal, plastic, stone and concrete comprising applying the adhesive composition onto a surface of the material to be bonded.

* * * * *

UNITED STATES PATENT AND TRADEMARK OFFICE
CERTIFICATE OF CORRECTION

PATENT NO. : 6,964,986 B2
DATED : November 15, 2005
INVENTOR(S) : Bachon et al.

It is certified that error appears in the above-identified patent and that said Letters Patent is hereby corrected as shown below:

Title page,
Item [73], Assignee, delete "Dusseldorf" and insert -- Duesseldorf --.
Item [56], References Cited, add:
-- OTHER PUBLICATIONS
Polyacryl-Verbindungen bis Quecksilber, Ullmanns Enzyklopadie der technischen Chemie, Vol. 19, pgs. 62-65 (1980). --.

Signed and Sealed this

Twenty-fourth Day of January, 2006

JON W. DUDAS
*Director of the United States Patent and Trademark Office*